United States Patent

Burgman et al.

(10) Patent No.: US 6,708,578 B2
(45) Date of Patent: Mar. 23, 2004

(54) TRANSFER GEAR ASSEMBLY FOR TRANSMISSION

(75) Inventors: Boris Iosifovich Burgman, Oak Park, MI (US); William J. Crecelius, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 42 days.

(21) Appl. No.: 10/092,930

(22) Filed: Mar. 7, 2002

(65) Prior Publication Data

US 2003/0167869 A1 Sep. 11, 2003

(51) Int. Cl.[7] .............................................. F16H 37/08
(52) U.S. Cl. ...................... 74/421 R; 384/455; 475/204
(58) Field of Search ............................... 74/421 R, 423, 74/413, 414; 384/455, 903; 475/200, 204, 206

(56) References Cited

U.S. PATENT DOCUMENTS

| | | | | |
|---|---|---|---|---|
| 1,369,210 A | * | 2/1921 | Zimmerman | 384/583 |
| 2,030,104 A | * | 2/1936 | Eksergian | 72/236 |
| 2,037,206 A | * | 4/1936 | Boden | 74/424 |
| 2,118,760 A | * | 5/1938 | Ernst | 384/455 |
| 3,385,133 A | * | 5/1968 | Terao | 475/243 |
| 3,827,520 A | * | 8/1974 | Mueller | 180/249 |
| 3,856,121 A | * | 12/1974 | Usui et al. | 192/53.34 |
| 4,124,256 A | * | 11/1978 | de Senneville | 384/455 |
| 4,283,963 A | * | 8/1981 | Hickey et al. | 74/400 |
| 4,346,622 A | * | 8/1982 | Pierce | 475/56 |
| 4,368,649 A | * | 1/1983 | Vahratian et al. | 475/66 |
| 4,391,157 A | * | 7/1983 | Jacklin | 74/402 |
| 4,397,198 A | * | 8/1983 | Borgersen et al. | 74/378 |
| 4,452,099 A | * | 6/1984 | Croswhite | 475/66 |
| 4,861,171 A | * | 8/1989 | Adachi | 384/455 |
| 4,911,260 A | * | 3/1990 | Miura et al. | 180/249 |
| 4,938,097 A | * | 7/1990 | Pierce | 475/72 |
| 5,125,284 A | * | 6/1992 | Carriere | 74/424 |
| 5,180,346 A | * | 1/1993 | Carriere | 475/200 |
| 5,261,750 A | * | 11/1993 | Eckhardt et al. | 384/455 |
| 5,425,345 A | * | 6/1995 | Lawrence et al. | 123/559.1 |
| 5,514,047 A | | 5/1996 | Tibbles et al. | 477/46 |
| 5,590,571 A | | 1/1997 | Tsuji | 74/606 R |
| 5,664,941 A | * | 9/1997 | Bearint | 418/259 |
| 5,716,247 A | * | 2/1998 | Ogino | 440/75 |
| 5,720,167 A | * | 2/1998 | Marich | 60/339 |
| 5,806,371 A | * | 9/1998 | Hibbler et al. | 74/409 |
| 5,823,051 A | | 10/1998 | Hall, III | 74/325 |
| 5,829,890 A | * | 11/1998 | Bauer et al. | 384/455 |
| 6,328,477 B1 | * | 12/2001 | Tsujimoto et al. | 384/450 |

* cited by examiner

*Primary Examiner*—David A. Bucci
*Assistant Examiner*—Julie K. Smith
(74) *Attorney, Agent, or Firm*—Leslie C. Hodges

(57) ABSTRACT

A transfer gear assembly includes a transfer gear rotatably supported directly by a tapered roller bearing and thrust bearing. A tapered snap ring is positioned in a circumferential groove on a hub to provide a preload on the tapered roller bearing and thrust bearing. The tapered roller bearing and thrust bearing each may include only a single race.

16 Claims, 4 Drawing Sheets

US 6,708,578 B2

TRANSFER GEAR ASSEMBLY FOR TRANSMISSION

TECHNICAL FIELD

The present invention relates to a transfer gear assembly for a transmission in which a needle roller thrust bearing and tapered roller bearing are preloaded against each other as they support a transfer gear.

BACKGROUND OF THE INVENTION

Vehicle transmissions with multiple axles include a transfer gear to transmit torque and speed from one axis to another. These transfer gears are typically supported by multiple bearings, each having races, so that the bearings can handle significant radial as well as fore-and-aft loads originating from the helical gears. The bearing preloaded positions are held either by a large nut or a tapered snap ring.

It is desirable to improve upon the above-described transfer gear arrangement by reducing part count, reducing space usage, improving serviceability and reducing allowable axial play for the transfer gear.

SUMMARY OF THE INVENTION

The present invention provides a transfer gear assembly in which the transfer gear is supported directly by a thrust bearing and tapered roller bearing, and a preload is applied to the bearings by a tapered snap ring on a stationary hub.

More specifically, the present invention provides a transfer gear assembly for a transmission including a stationary hub having a cylindrical hub surface and a radial hub surface. The cylindrical hub surface has a circumferential groove formed therein. A tapered inner race is positioned on the cylindrical hub surface. A complement of tapered rollers is positioned on the tapered inner race. A radially extending race is positioned against the radial hub surface. A thrust bearing is positioned against the radially extending race. A transfer gear is positioned around the hub and in direct contact with the tapered roller bearing and with the thrust bearing. A tapered snap ring is positioned in the circumferential groove in contact with the tapered inner race to provide a preload on the tapered roller bearing and thrust bearing. The tapered snap ring may be replaced by a different preload member, such as a nut.

The invention also provides a method of assembling a transfer gear assembly as described above wherein the tapered inner race, tapered rollers, radially extending race, thrust bearing and transfer gear are positioned around the hub and preloaded so that the tapered snap ring drops into the circumferential groove in the hub.

Accordingly, an object of the invention is to provide a transfer gear assembly which reduces space usage, reduces part count and improves serviceabilty.

The above object and other objects, features, and advantages of the present invention are readily apparent from the following detailed description of the best mode for carrying out the invention when taken in connection with the accompanying drawings.

DESCRIPTION OF THE PREFERRED EMBODIMENT

Figure 1:
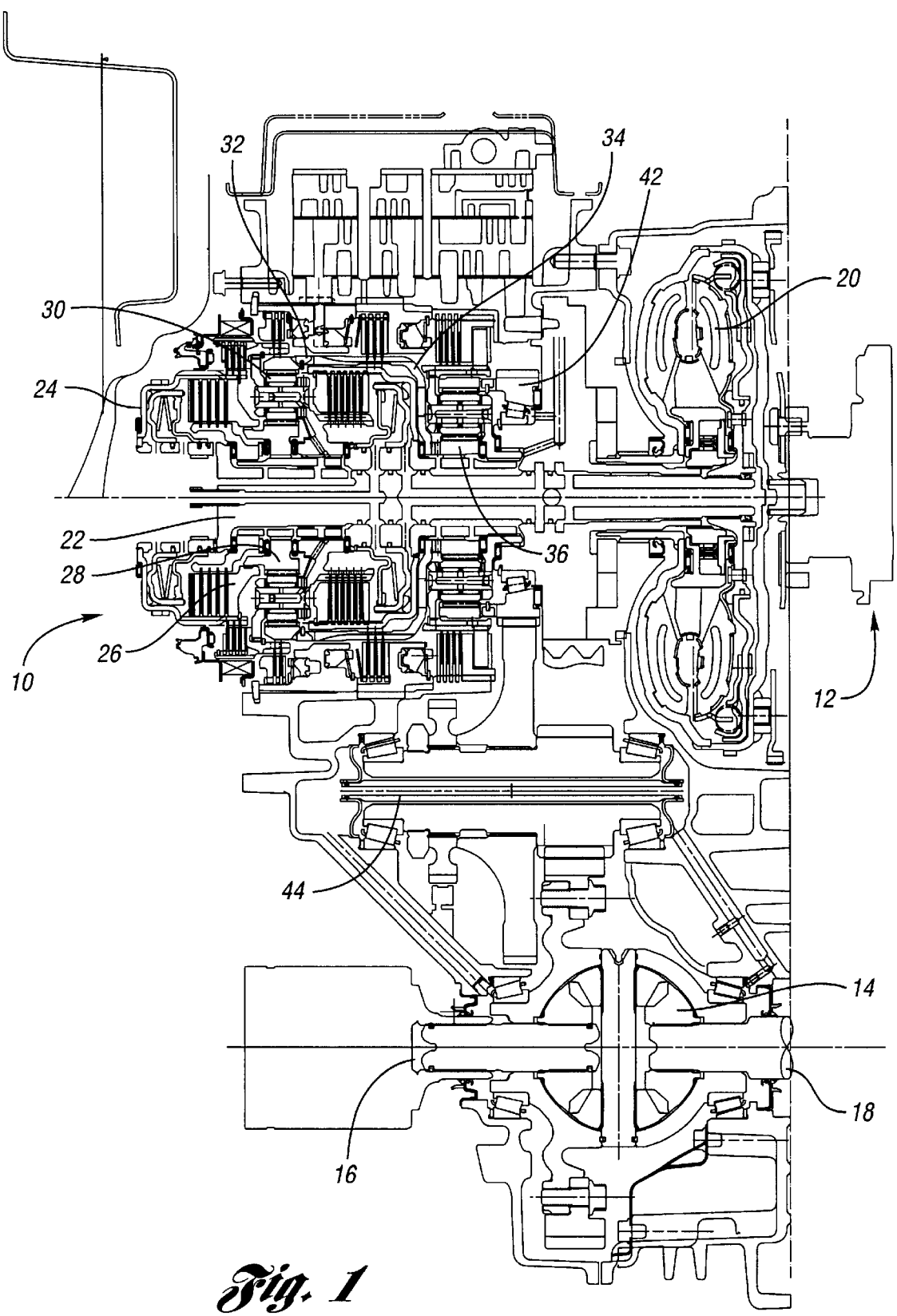
FIG. 1 shows a longitudinal cross-sectional view of a transmission in accordance with the present invention.

FIG. 1 shows a longitudinal cross-sectional view of a five-speed transmission 10 which receives power from an engine 12 and transfers this power through a differential 14 to left and right axles 16,18 of a vehicle.

By way of example, with the transmission in the first forward speed setting, the engine 12 drives the torque converter 20 which drives the input shaft 22. The input shaft is welded to the third clutch housing 24, which is splined to the third clutch backing plate 26, which rotates the input sun gear 28. The input sun gear 28 rotates input planetary gear 30, which rotates the input ring gear 32. The input ring gear 32 is splined to the second clutch hub 34. The second clutch hub 34 drives the output sun gear 36, which is welded to the second clutch hub 34. This structure is more readily seen in FIG. 2. The output sun gear 36 drives the output pinion gears 38, which drive the output ring gear 40. The output ring gear 40 is connected to the transfer gear 42, which transfers torque and speed to the second shaft 44 via the second transfer gear 46. The term "transfer gear" may be used interchangeably with "transfer pinion" or "transfer pinion gear."

Figure 2:
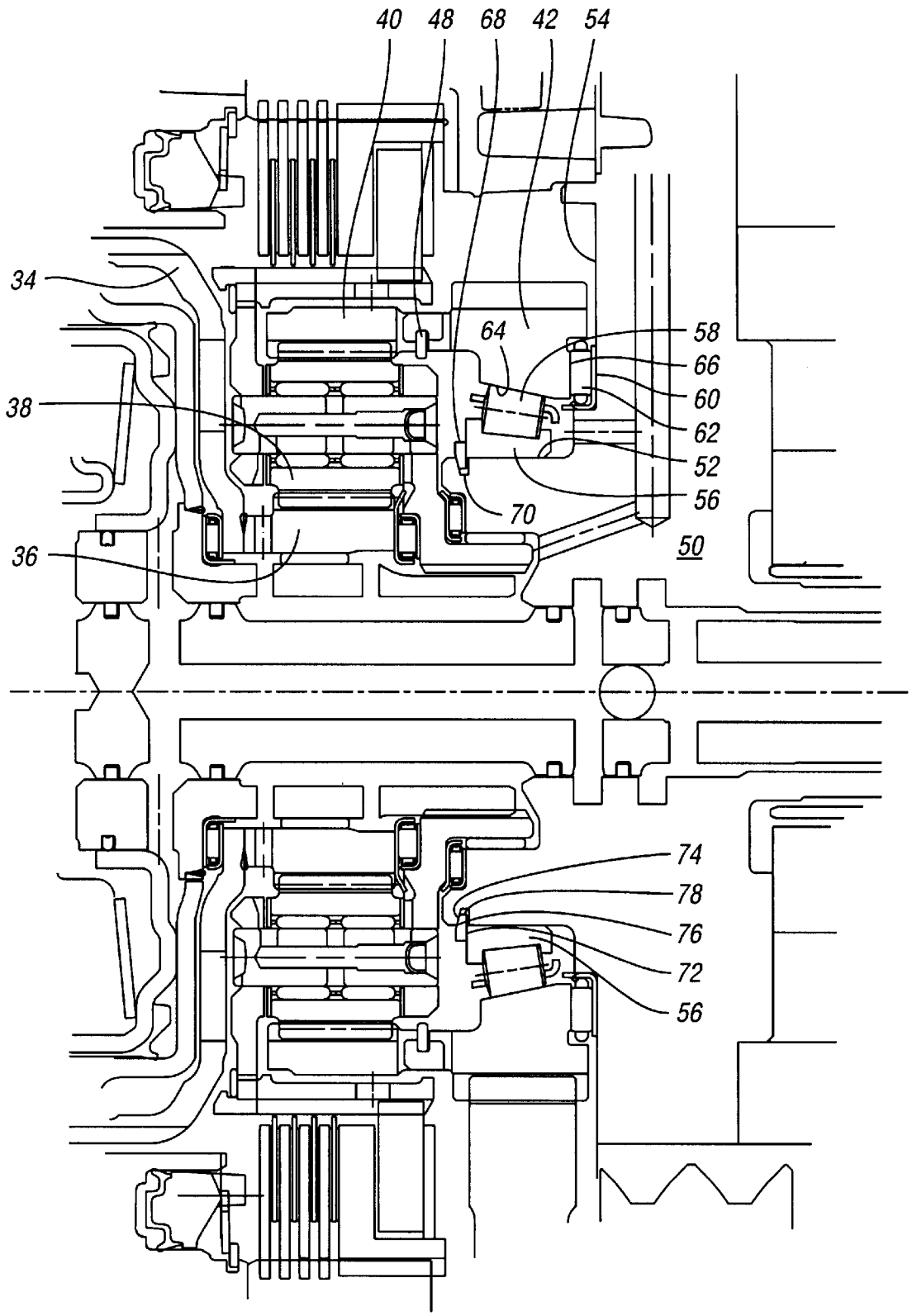
FIG. 2 shows an enlarged cross-sectional view of a transfer gear assembly taken from FIG. 1.

Still referring to FIG. 2, a snap ring 48 secures the output ring gear 40 to the transfer gear 42.

The present invention is particularly characterized by the structure which rotationally supports and preloads the transfer gear 42 and is most clearly shown in FIG. 2. As shown, a stationary pump cover 50 acts as a stationary hub having a cylindrical hub surface 52 and a radial hub surface 54.

A tapered inner race 56 is positioned against the cylindrical hub surface 52, and a complement of tapered rollers 58 is positioned on the tapered inner race 56. A radially extending race 60 is positioned against the radial hub surface 54, and a thrust bearing 62 is positioned against the radially extending race 60.

The transfer gear 42 has a conical interior surface 64 which is in direct contact with the tapered rollers 58, and a side face 66 which is in direct contact with thrust bearing 62.

A tapered snap ring 68 is positioned in a circumferential groove 70 which is formed in the cylindrical hub surface 52. The snap ring 68 has a flat surface 72 facing the tapered inner race 56, and an oppositely facing tapered surface 74 which engages a corresponding tapered surface 76 in the groove 70. The tapered snap ring takes up axial play and holds the components in place because of the locking angle provided by the tapered surfaces 74,76. The tapered snap ring 68 also has a narrow inner tip 78 facing the bottom of the groove 70.

The transfer gear 42 has approximately the same hardness as the hardness of the rollers of tapered roller bearing 58 and thrust bearing 62 so that these components are compatible and additional races are not required. The hardness of each such component is approximately 58–64 Rockwell C. The core of the transfer gear 42 is low carbon steel and the surface is carburized to enable the desired hardness, and the tapered roller bearing 58 and thrust bearing 62 are alloy steel components.

In this configuration, the transfer gear 42 forms the outer race for the tapered bearing 58, and the transfer gear 42 also forms the side race for the thrust bearing 62, thereby eliminating components and reducing packaging space.

Figure 3:
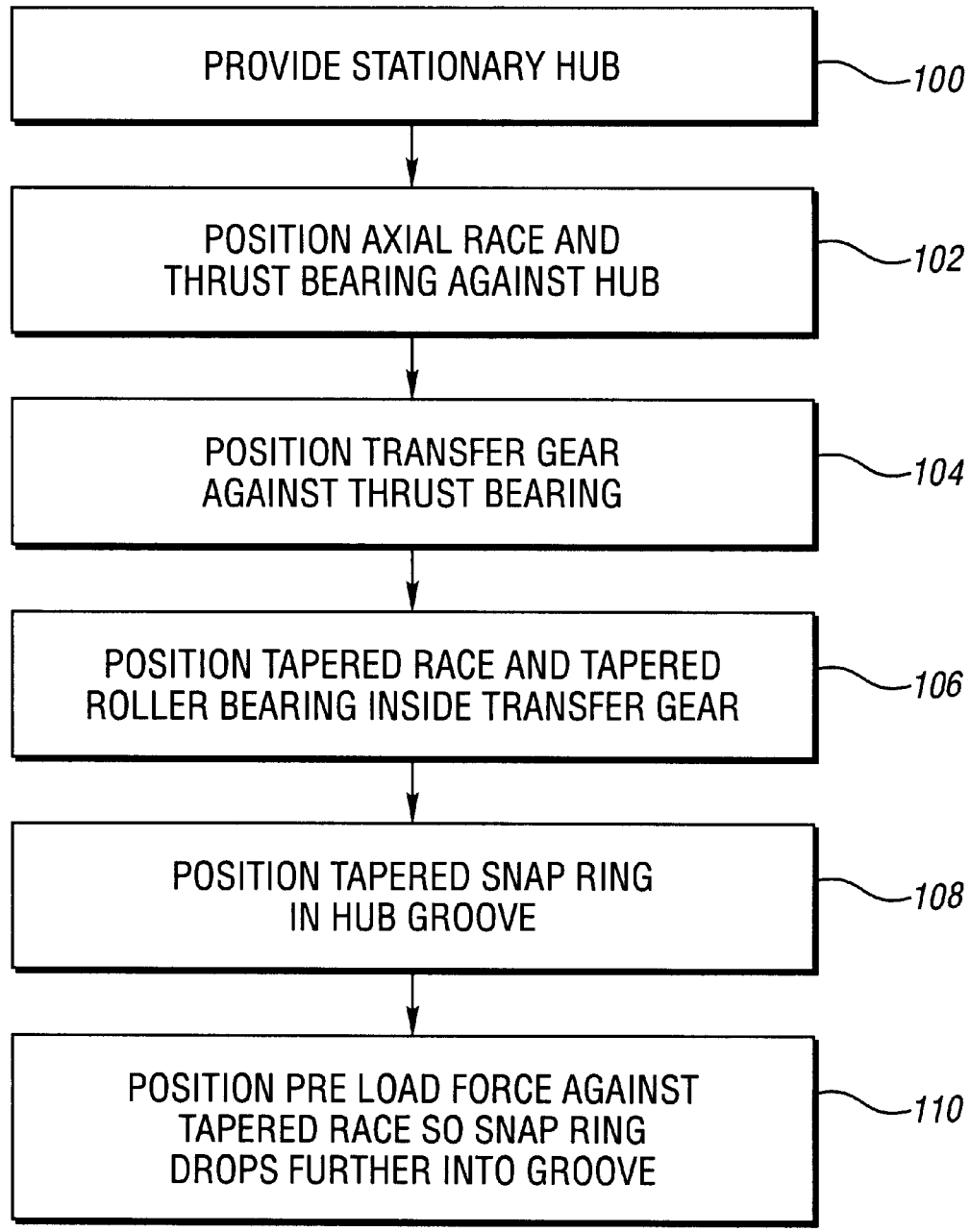
FIG. 3 shows a flow chart of a transmission assembly process in accordance with the present invention.

Turning to FIG. 3, a flow diagram of an assembly process is illustrated. As shown, in step 100 a stationary hub 50 is provided as described above. In step 102, the axial race 60 and thrust bearing 62 are positioned against the radial hub surface 54. In step 104, the transfer gear 42 is positioned against the thrust bearing 62. In step 106, the tapered race 56 and tapered roller bearing 58 are positioned against the conical interior surface 64 of the transfer gear 42. In step 108, the tapered snap ring 68 is positioned in the circumferential groove 70 of the hub 50. A preload force is applied against the tapered race 56 in step 110 toward the right as viewed in FIG. 1, so that the narrow inner tip 78 of the tapered snap ring 68 drops further into the cylindrical groove 70. When the preload force is removed, the tapered snap ring 68 maintains the preload.

Of course, the races 56,60, bearings 58,62 and transfer gear 42 could be pre-assembled and then installed onto the stationary hub 56 as a sub-assembly. Also, the tapered snap ring could be installed after the preload force has been applied against the tapered race 56.

The transfer gear assembly is serviceable by removing the snap ring 68 from the circumferential groove 70. This design also reduces or eliminates axial play for the transfer gear and provides a stiffer transfer gear.

Figure 4:
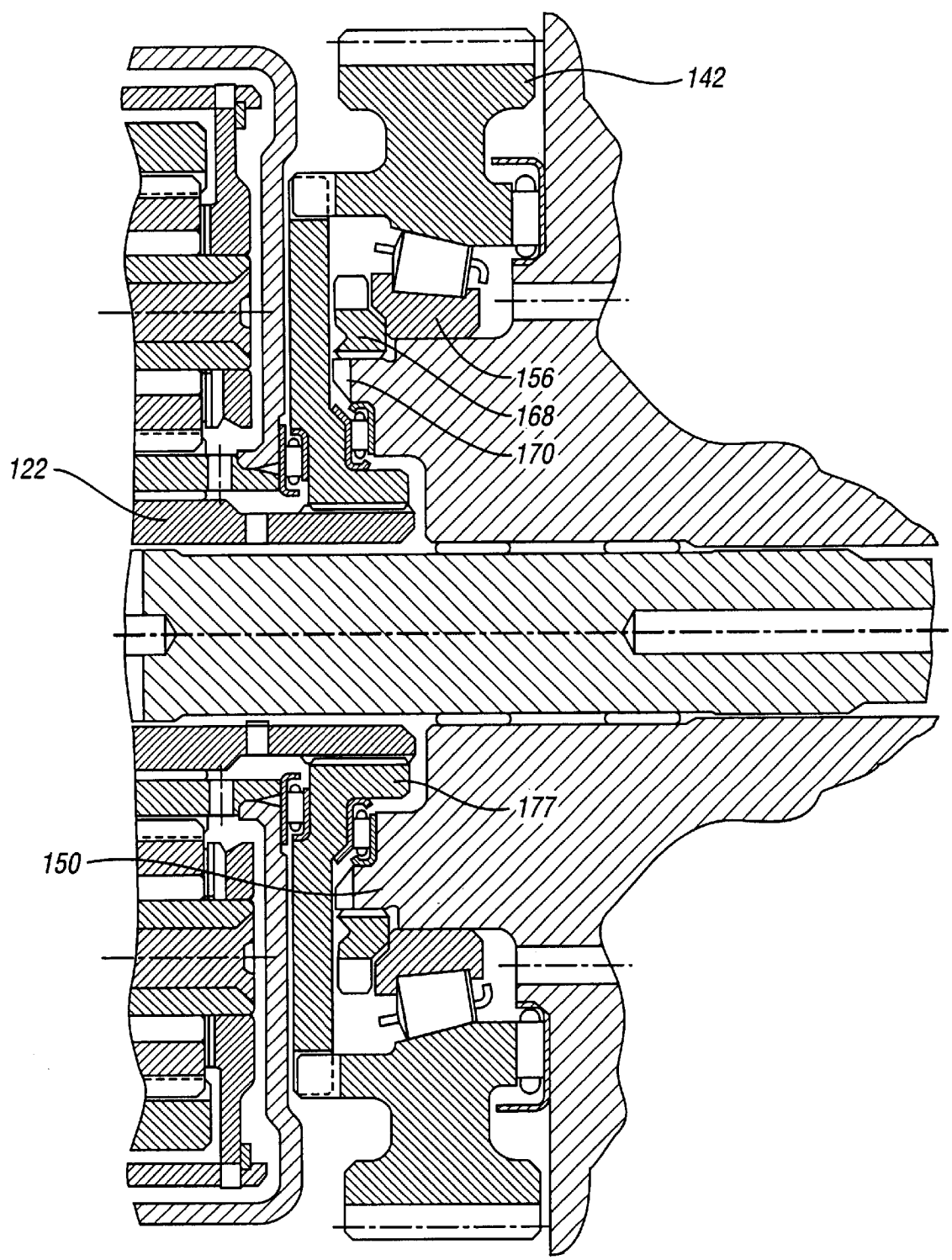
FIG. 4 shows a partial longitudinal cross-sectional view of a transfer gear assembly in accordance with an alternative embodiment of the invention.

The alternative arrangement is shown in FIG. 4. Transfer gear 142 receives the torque from output shaft 122 through flange 177. Preload on tapered inner rate 156 is applied by means of nut 168 threaded to radial hub 150. Once the desired preload is achieved, nut 168 gets locked by swaging the nut material into slot 170 extended radially on a face of hub 150.

While the best mode for carrying out the invention has been described in detail, those familiar with the art to which this invention relates will recognize various alternative designs and embodiments for practicing the invention within the scope of the appended claims.

What is claimed is:

1. A transfer gear assembly for a transmission comprising:
   a stationary hub having a cylindrical hub surface and a radial hub surface;
   a tapered inner race positioned on the cylindrical hub surface;
   a complement of tapered rollers positioned on the tapered inner race;
   a radially extending race positioned against the radial hub surface;
   a thrust bearing positioned against the radially extending race;
   a transfer gear positioned around the hub and in direct contact with said tapered roller bearing and said thrust bearing; and
   a preload member positioned on the cylindrical hub surface in contact with the tapered inner race to provide a preload on the tapered roller bearing and thrust bearing.

2. The transfer gear assembly of claim 1, wherein said stationary hub comprises a stationary pump cover.

3. The transfer gear assembly of claim 1, wherein said transfer gear has approximately the same hardness as the tapered roller bearing and the thrust bearing.

4. The transfer gear assembly of claim 3, wherein said hardness is approximately 58–64 Rockwell C.

5. The transfer gear assembly of claim 4, wherein said transfer gear comprises a high carbon steel, and said tapered roller bearing and thrust bearing comprise alloy steel.

6. The transfer gear assembly of claim 1, wherein said cylindrical hub surface includes a circumferential groove formed therein, and said preload member comprises a tapered snap ring positioned in the circumferential groove.

7. The transfer gear assembly of claim 6, wherein said tapered snap ring maintains the preload at a desired level.

8. The transfer gear assembly of claim 1, wherein the transfer gear is connected to a ring gear.

9. The transfer gear assembly of claim 1, wherein said preload member comprises a nut threaded onto said cylindrical hub surface.

10. A transfer gear assembly for a transmission comprising:
    a stationary hub having a cylindrical hub surface and a radial hub surface, said cylindrical hub surface having a circumferential groove formed therein;
    a tapered inner race positioned on the cylindrical hub surface;
    a radially extending race positioned against the radial hub surface;
    a transfer gear positioned around the hub;
    a complement of tapered rollers positioned between the transfer gear and the tapered inner race;
    a thrust bearing positioned between the radially extending race and the transfer gear; and
    a tapered snap ring positioned in the circumferential groove to provide a preload on the tapered roller bearing and thrust bearing.

11. The transfer gear assembly of claim 10, wherein said tapered snap ring has a flat surface facing the tapered inner race and an oppositely facing tapered surface, with a narrow inner tip of the snap ring facing into the circumferential groove.

12. The transfer gear assembly of claim 10, wherein said thrust bearing and tapered roller bearing are in direct contact with the transfer gear.

13. A method of assembling a transfer gear assembly in a transmission comprising:
    (a) providing a stationary hub having a cylindrical hub surface and a radial hub surface, said cylindrical hub surface having a circumferential groove formed therein;
    (b) positioning an axially extending race and thrust bearing against the radial hub surface;
    (c) positioning a transfer gear around the hub against the thrust bearing;
    (d) positioning a tapered inner race and tapered roller bearing on the hub against a conical interior surface of the transfer gear;
    (e) positioning a tapered snap ring in the circumferential groove; and
    (f) providing a preload force against the tapered inner race so that the tapered snap ring drops further into the circumferential groove.

14. The method of claim 13, wherein steps (b), (c) and (d) are performed simultaneously such that the components identified in steps (b), (c) and (d) are installed onto the stationary hub as a sub-assembly.

15. The method of claim 13, wherein step (e) is performed before step (f).

16. The method of claim 13, wherein said preload force of said step (f) is applied before step (e).

* * * * *